United States Patent Office 3,792,121
Patented Feb. 12, 1974

3,792,121
STABILIZED POLYPHENYLENE ETHER
COMPOSITIONS
Visvaldis Abolins, Delmar, and Peter F. Erhardt, Webster, N.Y., and Klaus E. Holoch, Roxheim, Pfalz, Germany, assignors to General Electric Company
No Drawing. Filed Oct. 14, 1971, Ser. No. 189,192
Int. Cl. C08g 23/18, 51/56, 51/60
U.S. Cl. 260—874
23 Claims

ABSTRACT OF THE DISCLOSURE

There are provided stabilized compositions consisting of a major proportion of a thermoplastic resin having a polyphenylene ether component and a minor proportion of a stabilizer consisting of (i) an organic chelating agent, (ii) a mixture of (i) with a hexaalkylphosphoric triamide, or (iii) a mixture of (i) or (ii) with a boron compound, a hydrazine compound or a mixture of such compounds.

This invention relates to thermoplastic compositions containing polyphenylene ethers and more particularly to the stabilization of such compositions with a stabilizing system selected from chelating agents, alone, or combined with compounds containing phosphorus-nitrogen bonds or optionally further including compounds containing boron-oxygen bonds and nitrogen-nitrogen bonds.

BACKGROUND OF THE INVENTION

It is known that the polyphenylene ethers and, particularly, the 2,6-dialkyl substituted polyphenylene ethers, are somewhat unstable under the influence of heat and light, exposure causing the resin to become dark colored, brittle and undesirable for many uses. The cause of the degradation is not fully understood, but is believed to be due, in part, to the presence of hydroxyl groups on the polymer chain, a sensitivity to oxygen containing atmospheres and the degradative effects of traces of impurities present in the resin composition.

The term "polyphenylene ether" includes the polymers disclosed and claimed in Hay, U.S. Pats. 3,306,874 and 3,306,875, and in Stamatoff, U.S. Pats. 3,257,357 and 3,257,358. They are prepared by the oxidative coupling of a phenolic compound, preferably in an inert solvent and in the presence of a complex catalyst formed from a copper salt and an amine.

Illustrative polyphenylene ethers are members of a family embraced by Formula I:

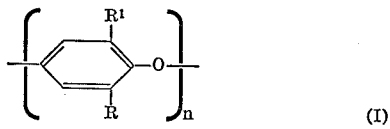

(I)

wherein R and $R^1$ are monovalent substituents selected from the group consisting of hydrogen, halogen, hydrocarbon radicals, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus, said radicals being free of a tertiary alpha-carbon atom, and $n$ is a whole integer of at least about 50. Preferably the R and $R^1$ groups will be hydrocarbon alkyl of from 1 to 8 carbon atoms. Especially preferably R and $R^1$ are each methyl. Such a compound is known as poly(2,6-dimethyl-1,4-phenylene)ether.

The term "thermoplastic resin composition having a normally unstable polyphenylene ether component" contemplates such polyphenylene ethers alone and the various copolymers, interpolymers and blends of polyphenylene ethers formed by interpolymerizing or blending the polyphenylene ethers with other monomers or polymers, such as the polyolefins, polystyrenes, polycarbonates and the like, wherein the polyphenylene ether is present in an amount sufficient to adversely affect the properties of the polymer composition due to the influence of heat and light.

One important such composition comprises a combination of polyphenylene ether and a styrene resin. Such compositions, which possess many of the desirable advantages of both the polyphenylene ether and the styrene resin, are disclosed and claimed in Cizek, U.S. Pat. 3,383,435. The most useful thermoplastic resin compositions of this type contain from about 20 to about 80, preferably from about 40 to about 60, parts by weight of said polyphenylene ether and from about 80 to about 20, preferably from about 60 to about 40, parts by weight of said polystyrene resin. The polystyrene resin will in general have at least 25% by weight of the repeating units derived from a monomer having Formula II:

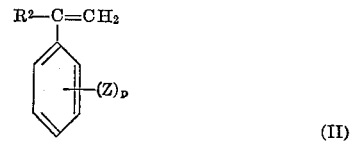

(II)

wherein $R^2$ is hydrogen, (lower)alkyl or halogen, Z is vinyl, halogen or (lower)alkyl; and $p$ is 0 or a whole number of from 1 to 5. Included in this family of resins will be homopolystyrene and polychlorostyrene and rubber modified polystyrenes, and styrene acrylonitrile copolymers, styrene-acrylonitrile-alpha-alkyl styrene terpolymers, styrene - acrylonitrile - butadiene terpolymers, poly-alpha-methylstyrene, copolymers of ethylvinyl benzene and divinyl benzene and the like. The most useful such compositions are those in which the polystyrene resin component is either homopolystyrene or a rubber modified (blended or grafted) high impact polystyrene, the rubber being, for example, a polybutadiene, polyisoprene or rubbery copolymer of butadiene and styrene. Polyphenylene ether components in such compositions are also known to adversely affect their properties under the influence of heat and light.

Previously, a large number of different compounds such as phenolic antioxidants, e.g., p-phenylphenol, N-stearoyl -p - aminophenol and 2,2' - methylenebis(4-ethyl - 6 - tert - butylphenol), have been used as heat and light stabilizers for polyphenylene ether compositions. These stabilizers have been generally unsatisfactory for even short exposure to heat. Other stabilizers such as the ketenes, benzoic anhydride and mercaptobenzimidazoles have also been proposed and have been found to be effective for short periods of exposure to heat, but not for the relatively long exposures required for many commercial uses.

In Zuccaro, U.S. Pat. 3,420,792, it is disclosed that the addition of a small amount of a hexaalkylphosphoric triamide is very effective to stabilize polyphenylene ethers, the amounts used ranging between about 0.01 and 10 parts by weight per 100 parts by weight of the resin. The hexaalkylphosphoric triamides are represented by Formula III:

(III)

wherein $R^{11}$, $R^{12}$ and $R^{13}$ are alkyl of from 1 to 6 carbon atoms, e.g., straight chain or branched, methyl, ethyl, propyl, i-propyl, butyl, hexyl and the like. The hexaalkylphosphoric triamides can be made in known ways, e.g., by reaction of a secondary amine with phosphorus oxychloride. Suitable such compounds are hexamethylphosphoric triamide, hexamethylphosphoric triamide, tris(methylethyl)phosphoric amide, hexa(hexyl)phosphoric triamide, and the like. The preferred embodiment is hexamethylphosphoric triamide.

In the Holoch patent, U.S. 3,639,334, it is disclosed that the addition of a small amount of a hydrazine compound is also very effective to stabilize polyphenylene ethers, the amounts used ranging from 0.01 to 6 parts by weight per 100 parts of resin. While hydrazines, in general, can be used, including anhydrous hydrazines, the preferred hydrazines are represented by Formula IV:

$$R^3\text{---}NH\text{---}NH\text{---}R^4 \qquad (IV)$$

wherein $R^3$ is a monovalent acyl radical of a carboxylic acid and $R^4$ is a monocyclic aryl radical. Illustrative compounds of Formula IV are benzoylphenylhydrazine, acetylphenylhydrazine, propanoylphenylhydrazine, butanoylphenylhydrazine, and the like. Especially preferred is acetylphenylhydrazine.

It has now been discovered that if certain organic chelating agents are substituted for hexaalkylphosphoric triamides, or, if they are used together with hexaalkylphosphoric triamides, or if certain boron containing compounds and hydrazine compounds are added to such chelating agents, alone, or mixed with hexaalkylphosphoric triamides, stabilizing systems with very high efficiency are obtained. In particular, such novel stabilizers used in combination with a thermoplastic resin having a polyphenylene ether component results in a composition having a much greater stability to heat and light as exemplified by increase in time to embrittlement of at least 100% as compared to a polyphenylene ether containing no additives. Moreover, in many cases the time to embrittlement is extended beyond what would be obtained with polyphenylene ethers stabilized with the corresponding amount of a hexaalkylphosphoric triamide or hydrazine compound alone. In addition to the increase in flex life, such compositions also provide economic advantages not possible with the prior art stabilizing systems.

DESCRIPTION OF THE INVENTION

According to this invention there are provided stabilized compositions comprising a major amount of a thermoplastic resin having a normally unstable polyphenylene ether component and a stabilizing amount of a stabilizer comprising (i) An organic chelating agent containing at least one of the following electron donor atoms: oxygen, nitrogen, sulfur or phosphorus, and which is capable of forming a stable complex with a bivalent ion of a metal selected from the first transition series of the Periodic Table of Elements;

(ii) A mixture of stabilizer (i) and a hexaalkylphosphoric triamide;

(iii) A mixture of stabilizer (i) or (ii) with a boron compound, a hydrazine compound or a mixture of a boron compound and a hydrazine compound.

In a preferred feature of this invention, the chelating agent will be one capable of forming a stable complex with a bivalent ion selected from $Cu^{++}$, $Co^{++}$, $Fe^{++}$ or $Mn^{++}$.

The preferred chelating agents will, in general, contain at least one carboxyl group and at least one amine group or hydroxyl group. Also useful are salts of such compounds, e.g., alkali metal and alkaline earth metal salts and salts with ammonia and amines.

Most preferably such chelating agents will contain at least two carboxyl groups and at least one hydroxyl group, e.g., tartaric acid, citric acid, gluconic acid and the like, including metal salts and amine salts thereof.

Equally suitable will be such organic chelating agents which contain at least two carboxyl groups and at least one amine group, e.g., hydroxyethyliminodiacetic acid, nitrilotriacetic acid, ethylenediaminetetraacetic acid, hydroxyethylethylenediaminetriacetic acid, diethylenetriaminepentaacetic acid, salicylidene 2-aminoethylaniline, as well as salts thereof, e.g., alkali metal, alkaline earth metal, ammonium, amine and mixed such salts.

Especially preferred as an organic chelating agent is ethylenediaminetetraacetic acid or an alkali metal or alkaline earth metal salt thereof, including mixed such salts.

Also especially preferred as an organic chelating agent is hydroxyethylethylenediaminetriacetic acid or an alkali metal or alkaline earth salt thereof, including mixed such salts.

The chelating agents are available commercially from a number of manufacturers and can be prepared in known ways.

According to a preferred feature of the invention, the composition will include a hexaalkylphosphoric triamide of Formula III hereinabove. Especially preferably, the hexaalkylphosphoric triamide will be hexamethylphosphoric triamide.

According to another preferred feature of this invention, the composition will include a hydrazine compound. Suitable hydrazines will include, for example, hydrazine, $H_2N\text{---}NH_2$ and substituted hydrazines wherein from 1 to 4 of the hydrogen atoms have been replaced with inert groups such as alkyl or aryl groups of from 1 to 24 carbon atoms, the alkyl groups being straight chain or branched, the aryl groups being mono or dicarbocyclic and said groups being substituted with hydrocarbon, hydroxy, alkoxy, aryloxy, carboalkoxy, and the like, or hydrazines substituted with alkanoyl groups, aroyl groups and similar groups including mixed such groups. Illustrative substituted hydrazines are acetylphenyl hydrazine, N,N'-dibenzylphenylhydrazine, phenyl hydrazine, N,N'-dilauryl hydrazine, N,N'-acetyl hydrazine, tetraanisyl hydrazine, tetraphenyl hydrazine, benzoylhydrazine, adipoyl hydrazine, 1,1-diphenyl-2-methacryloyl hydrazine, benzyl hydrazine, dimethyl hydrazine, propionyl hydrazine, tolyl hydrazine, stearoyl hydrazine, dodecyl hydrazine, N,N'-diphenyl-N'-dodecyl-N'-acetyl hydrazine, and the like. Preferred hydrazines will be those represented by Formula IV hereinabove. Especially preferred is acetylphenyl hydrazine, which is commercially available and can be made by known ways.

The boron compounds used as components are the above stabilizer compositions can vary widely, and will include both organic and inorganic boron compounds. Illustrative of the most useful are (a) boron oxide, $B_2O_3$;
(b) boronic acid of the formula

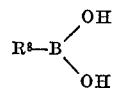

wherein $R^8$ is hydrogen, alkyl of from 1 to 5 carbon atoms or monocyclic aryl;

(c) a trialkyl borate of the formula $(R^9O)_3B$ wherein $R^9$ is alkyl of from 1 to 15 carbon atoms; or (d) boric acid, $H_3BO_3$.

Illustrative boron acids are boric acid, boronic acid, methylboronic acid, ethylboronic acid, butylboronic acid, hexylboronic acid, phenylboronic acid, methylphenylboronic acid, xylylboronic acid, 2,2'-dimethylheptylboronic acid, 2-methyl-3-ethyloctylboronic acid and the like. Illustrative alkyl borates are trimethylborate, triethyl borate, triisopropyl borate, tri-2-ethylhexyl borate, and the like.

The amount of the stabilizer to be added depends on its activity, the quality of the resin to be stabilized and the conditions to which the resin composition is to be exposed. The stabilizer may be added in an amount of between about 0.1 and about 10 parts by weight per 100 parts by weight of the resin, and preferably in an amount of between 1.0 and 8.0 parts by weight per 100 parts by weight of the resin.

With respect to stabilizers comprising combinations of the organic chelating agent with the other above-mentioned phosphoric triamide, hydrazine and the boron compounds, in general, the useful and preferred ranges of amounts will be as above-stated. If present the hexaalkylphosphoric triamide or the hydrazine compound should be added in an amount at least equal to the remaining components in the stabilizer combination and preferably in an amount equivalent to at least 1.5 times the remaining ingredients in the stabilizer portion of the composition. In all cases, the preferred amount of organic chelating agent will be from about 0.2 to about 3 parts per 100 parts by weight of resin. In most preferred embodiments, the chelating agent will comprise about 0.5 times the weight of either the triamide or the hydrazine. When present, in preferred embodiments, the boron compound will be present in an amount ranging between 1.0 and 2.0 parts by weight per 100 parts by weight of the resin.

The manner of adding the stabilizer to the thermoplastic resin composition containing a polyphenylene ether component is not critical to this invention. Hence, any convenient method can be employed. For example, the stabilizer composition can be blended with the powdered thermoplastic resin composition in a blender, e.g., a Waring-type blender. Alernatively, the resin can be dissolved in a suitable solvent and the stabilizer added to the solution. The stabilized composition can then be recovered, e.g., by precipitation, or by evaporation of the solvent.

The stabilized compositions of this invention are useful for all purposes for which polyphenylene ether compositions have heretofore been used, see, for example, the above-mentioned patents of Hay and Cizek. The stabilized compositions may, for example, be converted to films, fibers, molded articles and the like by conventional methods.

DESCRIPTION OF THE PREFERRED EMBODIMENTS

The following examples serve to illustrate the invention but are not intended to be limiting. Amounts specified in parts are parts by weight.

The following general Procedure A illustrates a process for the formation of a composition including a polyphenylene ether containing stabilizers according to this invention. In addition, it describes the method for evaluating the stabilized compositions and for comparing them with control samples, which omit certain of the stabilizing components.

Procedure A

Resin, in powdered form, and the selected stabilizer are blended together in a Waring blender for from 1 to 2 minutes. The mixture is then fed to an extruder and extruded at 500–600° F. (for polyphenylene ether alone) or at 425–500° F. (for polyphenylene ether blended with a polystyrene resin). The extruded strands are chopped into pellets. Two gram samples of the pellets are molded into specimen films by preheating at 500° F. and thereafter molding at a pressure of 20,000 p.s.i. at a temperature of 550° F. for 1 minute. The films so prepared have a thickness of about 10 mils. They are cut into strip specimens, measuring 4″ x ½″ and placed in an air circulating oven, maintained at an elevated temperature. The time to embrittle is measured for each of the specimens by folding the films at various times during the heat aging process until the film strip embrittles to a point where it snaps when partially folded. This time is defined as the time to embrittle.

EXAMPLES 1–3

The polyphenylene ether is poly(2,6-dimethyl-1,4-phenylene) ether, prepared by the procedure of the above-mentiode Hay patents, intrinsic viscosity of about 0.5 deciliter/gram, measured in chloroform at 30° C. (General Electric Company, PPO). The polystyrene resin is rubber modified high impact polystyrene containing about 9% by weight of polystyrene grafted polybutadiene rubber (Monsanto Company, HT-91). Heat aging tests are carried out at 125° C. The compositions and results are summarized in Table 1.

TABLE 1

[Compositions of polyphenylene ether and polystyrene resin stabilized with organic chelating agent]

| Example | Composition | Parts | Time to embrittle (hrs.) |
|---|---|---|---|
| 1-C-1 | Poly(2,6-dimethyl-1,4-phenylene)ether | 45 | <15 |
| | Rubber modified polystyrene | 55 | |
| | (Control—no additives). | | |
| 1-C-1 | Poly(2,6-dimethyl-1,4-phenylene)ether | 45 | 150–200 |
| | Rubber modified polystyrene | 55 | |
| | N-acetyl-N′-phenyl hydrazine | 1 | |
| | (Control—no chelating agent). | | |
| 1 | Poly(2,6-dimethyl-1,4-phenylene)ether | 45 | 350 |
| | Rubber modified polystyrene | 55 | |
| | N-acetyl-N′-phenyl hydrazine | 1 | |
| | N,N,N′,N′-ethylenediamine tetraacetic acid (Geigy, Sequestrene AA). | 0.5 | |
| 2-C | Poly(2,6-dimethyl-1,4-phenylene)ether | 45 | 300 |
| | Rubber modified polystyrene | 55 | |
| | Hexamethylphosphoric triamide | 1 | |
| | Triethyl borate | 1 | |
| | N-acetyl-N′-phenyl hydrazine | 1 | |
| | (Control—no chelating agent). | | |
| 2 | Poly(2,6-dimethyl-1,4-phenylene)ether | 45 | 450 |
| | Rubber modified polystyrene | 55 | |
| | Hexamethyl phosphoric triamide | 1 | |
| | Triethyl borate | 1 | |
| | N-acetyl-N′-phenyl hydrazine | 1 | |
| | N,N,N′,N′-ethylenediamine tetraacetic acid. | 0.5 | |
| 3-C | Poly(2,6-dimethyl-1,4-phenylene)ether | 45 | 200 |
| | Rubber modified polystyrene | 55 | |
| | Hexamethylphosphoric triamide | 1 | |
| | Boric acid | 0.5 | |
| | N-acetyl-N′-phenyl hydrazine | 1 | |
| | (Control—no chelating agent). | | |
| 3 | Poly(2,6-dimethyl-1,4-phenylene)ether | 45 | 400–450 |
| | Rubber modified polystyrene | 55 | |
| | Hexamethylphosphoric triamide | 1 | |
| | Boric acid | 0.5 | |
| | N-acetyl-N′-phenyl hydrazine | 1 | |
| | N,N,N′,N′-ethylenediamine tetraacetic acid. | 0.5 | |

It can be seen that the addition of the chelating agent provides compositions with substantially increased flex life. Fourfold improvements are also seen in heat aging at 150° and 175° C.

EXAMPLE 4–5

The procedure of Example 1 is repeated with the following formulations and the results summarized in Table 2 are obtained. Heat aging is carried out at 175° C.

TABLE 2

[Compositions of polyphenylene ether and polystyrene resins stabilized with organic chelating agents]

| Example | Composition | Parts | Time to embrittle (hrs.) |
|---|---|---|---|
| 1-C-1 | Poly(2,6-dimethyl-1,4-phenylene)ether | 45 | <15 |
| | Rubber modified polystyrene | 55 | |
| | (Control—no additives). | | |
| 4 | Poly(2,6-dimethyl-1,4-phenylene)ether | 45 | 90 |
| | Rubber modified polystyrene | 55 | |
| | N,N,N′,N′-ethylenediamine tetraacetic acid, disodium salt (Geigy-Sequestrene-NA2). | 0.5 | |
| 5 | Poly(2,6-dimethyl-1,4-phenylene)ether | 45 | 150 |
| | Rubber modified polystyrene | 55 | |
| | N-hydroxyethyl-N,N′,N′-ethylenediaminetriacetic acid, trisodium salt (Geigy, Chel DM-41). | 0.5 | |

It is seen that the chelating agents extend the flex life 6-fold and 10-fold, respectively.

EXAMPLE 6–13

The method of Procedure A is used to prepare the following compositions:

| Example | Composition | Parts |
|---|---|---|
| 6 | Poly(2,6-dimethyl-1,4-phenylene)ether | 100 |
|   | N,N,N',N'-ethylenediamine tetraacetic acid | 0.5 |
| 7 | Poly(2,6-dimethyl-1,4-phenylene)ether | 100 |
|   | N,N,N',N'-ethylenediamine tetraacetic acid disodium salt | 0.5 |
| 8 | Poly(2,6-dimethyl-1,4-phenylene)ether | 100 |
|   | N,N,N',N'-ethylenediamine tetraacetic acid, disodium calcium salt | 0.5 |
| 9 | Poly(2,6-dimethyl-1,4-phenylene)ether | 100 |
|   | N,N,N',N'-ethylenediamine tetraacetic acid, tetrasodium salt | 0.5 |
| 10 | Poly(2,6-dimethyl-1,4-phenylene)ether | 100 |
|   | N,N'-bis(salicylidene 2-aminoethyl)-aniline (Geigy, Chel SAA) | 0.5 |
| 11 | Poly(2,6-dimethyl-1,4-phenylene)ether | 100 |
|   | N-hydroxyethyl-N,N',N'-ethylenediamine triacetic acid, trisodium salt | 0.5 |
| 12 | Poly(2,6-dimethyl-1,4-phenylene)ether | 100 |
|   | Nitrilotriacetic acid (Geigy, NTA-35) | 0.5 |
| 13 | Poly(2,6-dimethyl-1,4-phenylene)ether | 100 |
|   | N-hydroxyethyl-N,N',N'-ethylenediamine triacetic acid | 0.5 |

Heat stabilized compositions according to this invention are obtained.

The above procedures are repeated, substituting the following for α-hydroxypolycarboxylic acids for the aminopolycarboxylic acid chelating agents: citric acid, tartaric acid, and gluconic acid. Stabilized compositions according to this invention are obtained.

Mixtures of poly(2,6-dimethyl-1,4-phenylene)ether and organic chelating agents are extruded at 550° F. and the color of the extrudate is observed. Without additives the extrudate is dark amber in color, indicating deterioration by heat. Addition of 1 part of hydroxyethylene ethylenediamine triacetic acid (Geigy-Chel DM acid) per 100 parts by weight of polyphenylene ether resin provides a light amber extrudate. Substitution of 1 part disodium calcium ethylenediamine tetraacetic acid provides an extrudate even lighter in color than light amber. Substitution of 0.5 parts of tetrasodium ethylenediamine tetraacetic acid and 0.5 parts of calcium, disodium ethylenediamine tetraacetate, also provides compositions according to this invention that extrude without darkening during conventional processing.

The procedures outline above are repeated, substituting the following for poly(2,6-dimethyl-1,4-phenylene) ether:

poly(2,6-diethyl-1,4-phenylene)ether,
poly(2-methyl-6-ethyl-1,4-phenylene)ether,
poly(2-methyl-6-propyl-1,4-phenylene)ether,
poly(2,6-dipropyl-1,4-phenylene)ether, and
poly(2,6-diphenyl-1,4-phenylene)ether.

Stabilized compositions according to this invention are obtained.

The procedures outline above are repeated, substituting for the poly(2,6-dimethyl-1,4-phenylene)ether, the following thermoplastic resin compositions (Cizek, U.S. 3,383,435):

| Compositions: | Parts |
|---|---|
| Poly(2,6-dimethyl-1,4-phenylene)ether | 50 |
| Homopolystyrene | 50 |
| Poly(2,6-dimethyl-1,4-phenylene)ether | 50 |
| High Impact rubber modified polystyrene (10% by weight polybutadiene) | 50 |
| Poly(2,6-dimethyl-1,4-phenylene)ether | 50 |
| Poly(alpha-methyl styrene) | 50 |
| Poly(2,6-dimethyl-1,4-phenylene)ether | 50 |
| Styrene-acrylonitrile copolymer (27% ACN) | 50 |

Stabilized compositions according to this invention are obtained.

Other modifications and variations of the present invention are possible in light of the above teachings. The compositions may also include various fillers, reinforcements, i.e., fibrous glass, modifying agents, dyes, pigments, plasticizers and the like. It is therefore to be understood that changes may be made in the particular embodiments of the invention described and these will be within the full intended scope of the invention as defined by the appended claims.

What is claimed is:

1. A stabilized composition comprising a major amount of a thermoplastic resin comprising a normally unstable polyphenylene ether of the formula

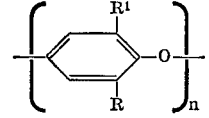

wherein R and R¹ are monovalent substituents selected from the group consisting of hydrogen, halogen, hydrocarbon radicals, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus, said radicals being free of a tertiary alpha-carbon atom, and $n$ is a whole integer of at least 50 and a stabilizing amount of a stabilizer comprising an organic chelating agent containing at least one carboxyl group and at least one group selected from the class consisting of an amine group and a hydroxyl group, and which is capable of forming a stable complex with a bivalent ion selected from the group consisting of $Cu^{++}$, $Co^{++}$, $Fe^{++}$ and $Mn^{++}$.

2. A composition as defined in claim 1 wherein said organic chelating agent contains at least two carboxyl groups and at least one hydroxyl group.

3. A composition as defined in claim 1 wherein said organic chelating agent contains at least two carboxyl groups and at least one amine group.

4. A composition as defined in claim 3 wherein said organic chelating agent is selected from the group consisting of ethylenediamine tetraacetic acid, an alkali metal or alkaline earth metal salt thereof and mixed such salts.

5. A composition as defined in claim 3 wherein said organic chelating agent is selected from the group consisting of hydroxyethylethylenediamine triacetic acid, an alkali metal or alkaline earth salt thereof and mixed such salts.

6. A composition as defined in claim 1 wherein R and R¹ are each methyl.

7. A composition as defined in claim 1 wherein said thermoplastic resin composition includes a polystyrene resin having at least 25% by weight of the repeating units derived from the monomer having the formula:

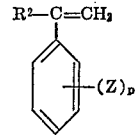

wherein R² is selected from the group consisting of hydrogen, (lower)alkyl and halogen, Z is selected from the group consisting of vinyl, halogen and (lower)alkyl; and $p$ is 0 or a whole number of from 1 to 5.

8. A composition as defined in claim 7 wherein said thermoplastic resin composition contains from about 20 to about 80 parts by weight of said polyphenylene ether and from about 80 to about 20 parts by weight of said polystyrene resin.

9. A stabilized composition as defined in claim 1 wherein the stabilizer constitutes from about 1.0 to about 10.0 parts by weight per 100 parts by weight of said resin.

10. A composition as defined in claim 1 wherein said stabilizer also includes a hexaalkylphosphoric triamide.

11. A composition as defined in claim 10 wherein said hexaalkylphosphoric triamide is of the formula

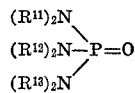

wherein $R^{11}$, $R^{12}$ and $R^{13}$ are alkyl of 1 to 6 carbon atoms.

12. A composition as defined in claim 11 wherein said hexaalkylphosphoric triamide is hexamethylphosphoric triamide.

13. A composition as defined in claim 10 wherein said stabilizer also includes a member selected from the group consisting of a boron compound selected from the group consisting of boron oxide, a boronic acid of the formula

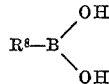

wherein $R^8$ is hydrogen, alkyl of from 1 to 15 carbon atoms or monocyclic aryl, a trialkyl borate of the formula $(R^9O)_3B$ wherein $R^9$ is alkyl of from 1 to 15 carbon atoms, and boric acid, $HBO_3$, a hydrazine and a mixture of said boron compound and a hydrazine.

14. A composition as defined in claim 13 wherein said boron compound is boric acid.

15. A composition as defined in claim 13 wherein said boron compound is triethyl borate.

16. A composition as defined in claim 7 wherein said polystyrene resin is homopolystyrene.

17. A composition as defined in claim 7 wherein said polystyrene resin is a rubber modified high impact polystyrene, said rubber being selected from the group consisting of a polybutadiene, a polyisoprene and a rubbery copolymer of butadiene and styrene.

18. A composition as defined in claim 13 wherein said polyphenylene ether is poly(2,6-dimethyl-1,4-phenylene) ether, and said stabilizer comprises a mixture of ethylenediamine tetraacetic acid, hexamethylphosphoric triamide, triethyl borate and acetyl phenyl hydrazine.

19. A composition as defined in claim 13 wherein said polyphenylene ether is poly(2,6-dimethyl-1,4-phenylene) ether, and said stabilizer comprises a mixture of ethylenediamine tetraacetic acid, hexamethylphosphoric triamide, boric acid and acetyl phenyl hydrazine.

20. A composition as defined in claim 1 wherein said stabilizer also includes a hydrazine.

21. A composition as defined in claim 20 wherein said hydrazine is of the formula $$R^3-NH-NH-R^4$$

wherein $R^3$ is a monovalent acyl radical of a carboxylic acid and $R^4$ is a monocyclic aryl radical.

22. A composition as defined in claim 21 wherein said hydrazine compound is N-acetyl-N'-phenylhydrazine.

23. A composition as defined in claim 21 wherein said polyphenylene ether is poly(2,6-dimethyl-1,4-phenylene) ether, and said stabilizer is selected from the group consisting of a mixture of ethylenediamine tetraacetic acid and acetyl phenyl hydrazine and a mixture of disodium ethylenediamine tetraacetate and acetyl phenyl hydrazine.

References Cited

UNITED STATES PATENTS

| | | | |
|---|---|---|---|
| 2,667,522 | 1/1954 | McElroy | 260—45.85 A |
| 3,152,155 | 10/1964 | Langer | 260—45.75 R |
| 3,383,435 | 5/1968 | Cizek | 260—876 |
| 3,420,792 | 1/1969 | Zuccaro | 260—45.9 R |
| 3,444,133 | 5/1969 | Behr et al. | 260—47 ET |
| 3,465,062 | 9/1969 | Holoch et al. | 260—874 |

MURRAY TILLMAN, Primary Examiner

J. ZIEGLER, Assistant Examiner

U.S. Cl. X.R.

260—45.7 R, 45.85 N, 45.9 R, 47 ET, 876

PO-1050
(5/69)

UNITED STATES PATENT OFFICE
CERTIFICATE OF CORRECTION

Patent No. 3,792,121      Dated February 12, 1974

Inventor(s) Visvaldis Abolins, et al

It is certified that error appears in the above-identified patent and that said Letters Patent are hereby corrected as shown below:

Col. 3, line 2, "hexamethylphosphoric triamide" should read --hexaethylphosphoric triamide--

Col. 4, line 40, "N,N'-" should read --N,N- --

Col. 6, line 1, "mentiode" should read --mentioned-- line 20, in Table 1, under "Example" the example numbered "1-C-1" (second instance) should read --1-C-2--

Signed and sealed this 17th day of September 1974.

(SEAL)
Attest:

McCOY M. GIBSON JR.
Attesting Officer

C. MARSHALL DANN
Commissioner of Patents